W. Hawes.
Oil Press.
No. 109,206.  Patented Nov. 15, 1870.
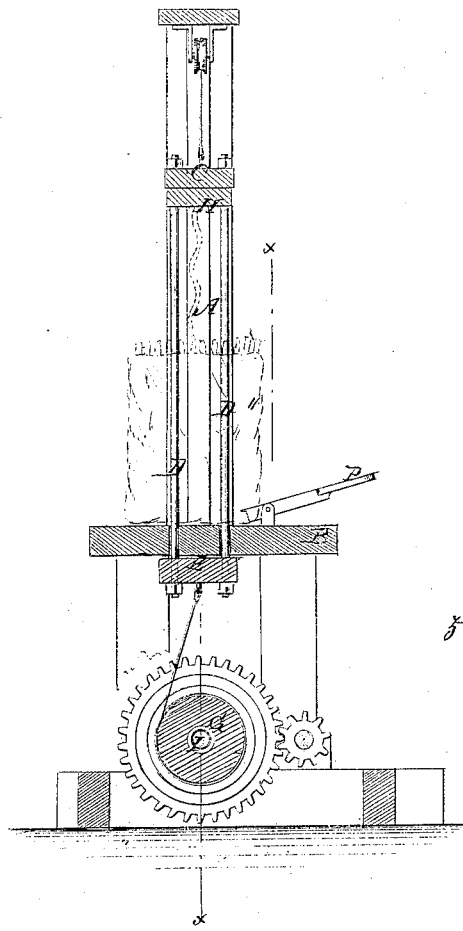
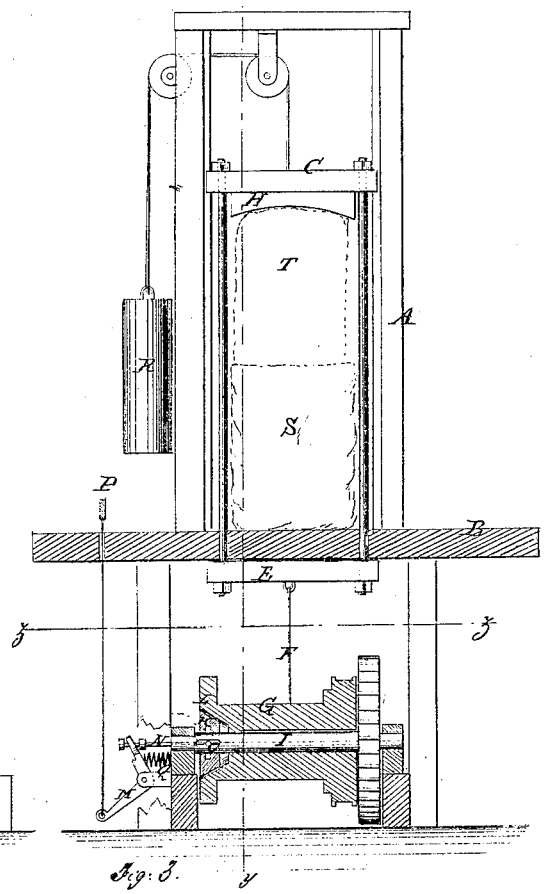
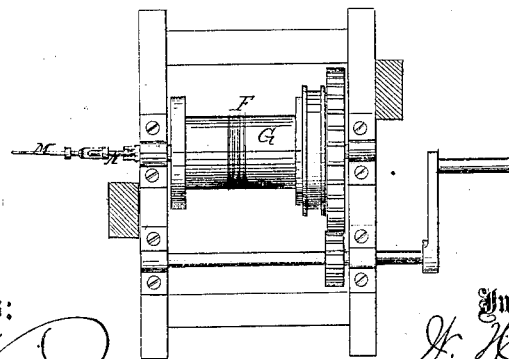
Witnesses:
Chas. Nida
L. S. Mabee
Inventor:
W. Hawes
per
Attorneys.

United States Patent Office.

WASHINGTON HAWES, OF PORT RICHMOND, NEW YORK.

Letters Patent No. 109,206, dated November 15, 1870.

IMPROVEMENT IN OIL-CAKE PACKING APPARATUS.

The Schedule referred to in these Letters Patent and making part of the same.

*To all whom it may concern:*

Be it known that I, WASHINTON HAWES, of Port Richmond, in the county of Richmond and State of New York, have invented a new and improved Oil-Cake Packing Apparatus; and I do hereby declare that the following is a full, clear, and exact description thereof, which will enable others skilled in the art to make and use the same, reference being had to the accompanying drawing forming part of this specification.

This invention relates to improvements in apparatus for forcing one or more of the last cakes into the sacks previously filled or nearly filled by hand, to pack the said sacks as much as possible; and It consists in a vertically-working follower, actuated by a winding-drum and cord, for forcing it down, which drum is connected with a driving-shaft for working it, by a friction-clutch, having a foot-lever attachment for varying the friction, and the power on the follower while in action, so that the same may be regulated according to the capacity of the oil-cake, whereby the great losses by breaking the cakes in the common hand process of packing may be avoided.

Figure 1 is a sectional elevation of my improved machine, taken on the line *x x* of fig. 2.

Figure 2 is a sectional elevation taken on the line *y y* of fig. 1.

Figure 3 is a horizontal section on the line *z z* of fig. 1.

Similar letters of reference indicate corresponding parts.

A represents a pair of vertical guides erected on the top of a platform, B, in any suitable way.

C is a follower working on the said guides, and connected by rods D with the beam E, which is connected by the cord F with the winding-drum G.

Said follower has a block, H, at the under side, which has a concave lower face corresponding to the shape of the end of the oil-cake.

The drum G is arranged on the shaft I to turn loosely, or to allow the shaft to turn without turning it, and a conical male part, K, of a clutch, is arranged on the shaft, to act in conjunction with the female part L in the end of the drum, for applying and releasing the power for turning the drums.

This part K is connected with the cranked lever M by a rod, N, working in the hollow axis of the shaft, and radial pins O projecting through slots in the shaft.

This cranked lever is actuated by a foot-lever, P, for gearing the clutch together, and by the spring Q, for separating them.

The follower has a counter-balance weight, R, suitably applied to it, to raise it after having been forced down.

The dotted lines S represent the partly-filled bag, and

T, the cake to be forced in.

The bags are filled by placing the cakes in endwise side by side, until as many cakes are in as can well be pressed in by hand; then, in order to completely fill the bag, and stretch it so as to bind the cakes tight enough to prevent them from moving on each other, the last cake or two must be forced in with considerable pressure.

This has been heretofore done by placing a cap or block, shaped like the block H, on the upper end of the cake, after the lower end has been entered between two of the cakes in the bag, and driving thereon with a mallet or maul.

This operation is slow and tedious; but the greatest objection to it is that the effect of the concentrated application of force by a blow is much less efficient in forcing the cake in, and much more liable to break it, than a slow and continuous application, which it is the object of this invention to effect.

When the force is applied in this way, the cake will bend considerably before breaking, if too much power be applied; and the attendant, observing the bending, may relax the pressure on the friction-clutch, and thereby graduate the pressure on the cake to its capacity, which will then be forced in at a reduced rate of speed.

It will be seen, therefore, that the essential feature of the invention is the application of the power to the follower-moving devices through the intervention of a friction-clutch, which affords the requisite facilities for regulating and controlling it, according to the nature of the case in hand.

The particular construction of the clutch or arrangement of the actuating devices may be varied to suit circumstances or taste.

It is intended that the arrangement of the press shall be such that the bags may be moved under the follower on trucks, and held thereon during the operation.

Having thus described my invention,

I claim as new and desire to secure by Letters Patent—

The treadle-clutch mechanism P M N K Q, the drum G L, placed loosely on end, perforated shaft I, and the rope F, all combined with the follower C H E, as and for the purpose described.

Witnesses:        WASHINGTON HAWES.
JAMES B. POLLOCK,
ABRAHAM C. GIBSON.